W. E. RAEBURN.
NUT LOCK.
APPLICATION FILED MAY 17, 1913.
1,128,186.
Patented Feb. 9, 1915.
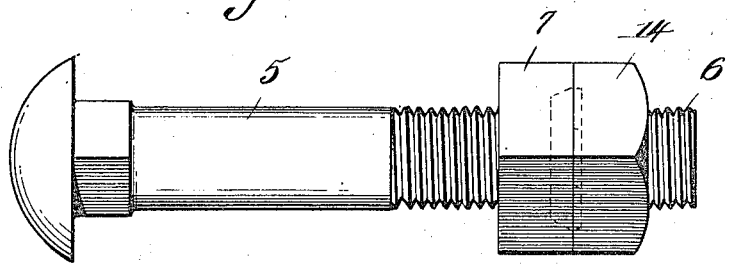
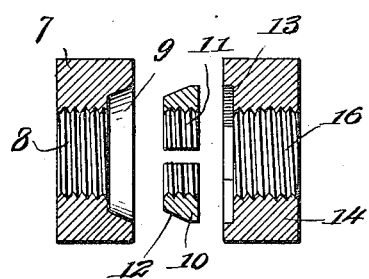
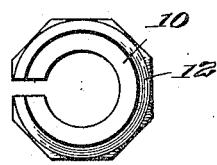
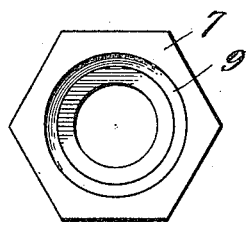
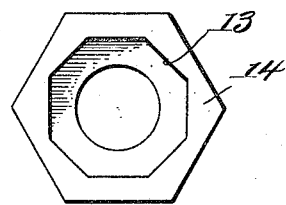
Witnesses
Inventor
William E. Raeburn
By
his Attorney

UNITED STATES PATENT OFFICE.

WILLIAM E. RAEBURN, OF TORONTO, ONTARIO, CANADA.

NUT-LOCK.

1,128,186. Specification of Letters Patent. Patented Feb. 9, 1915.

Application filed May 17, 1913. Serial No. 768,383.

*To all whom it may concern:*

Be it known that I, WILLIAM E. RAEBURN, a subject of the King of Great Britain, residing at Toronto, in the Province of Ontario and Dominion of Canada, have invented certain new and useful Improvements in Nut-Locks, of which the following is a specification.

This invention relates to nut locks and has particular reference to superposed nuts having an expansible means interposed therebetween for preventing the rotation of the nuts on the bolt after the same have been threaded to the desired position.

An object of this invention is the provision of a device of this character wherein superposed nuts are provided having a suitable means interposed therebetween for holding the same into engagement with each other, and positively locking the nuts from rotation on the bolt after the same has been threaded to the desired point, thus especially adapting the same for use on railroads or the like where it is desired to have a positive locking means for holding the ends of rails etc. together.

Other objects as well as the nature, characteristic features and scope of my invention will be more readily understood from the following description taken in connection with the accompanying drawings and pointed out in the claims forming a part of this specification, wherein:—

Figure 1 is a side elevation of a bolt showing my improved device threaded thereon; Fig. 2 is a sectional view of the nuts and washer; Fig. 3 is an elevation of the washer; Fig. 4 is an elevation looking in the outer face of the inner nut; and Fig. 5 is an elevation looking at the inner face of the outer nut.

In the drawings wherein is shown the preferred form of my invention the numeral 5 represents a bolt having an externally screw threaded end 6 on which is threaded a nut 7. The nut 7 is provided with an internally threaded bore 8 on the one end thereof and the opposite end provided with a frusto-conical bore 9. An elastic washer 10 is provided which has an internally threaded bore 11 and a frusto-conical outer peripheral end 12 which is adapted for frictional engagement with the end 9 of the nut 7. The opposite end of the washer 10 is provided with an externally hexagonal end which is adapted to register with the hexagonal inner bore 13 on the one end of the outer nut 14. The said outer nut having an internally threaded bore 16 and the said washer 10 being split so as to allow for the expansion and contraction of the same.

In operation the inner nut 7 is threaded on the bolt 5 to the desired point as shown to advantage in Fig. 1 having the frusto-conical inner bore facing the outer end of the bolt. The elastic washer 10 is next threaded on the bolt until the outer periphery 12 thereof contacts with the inner periphery 9 of the nut 7. The outer nut 14 is then threaded on the bolt until the hexagonal inner end 13 registers with the hexagonal end of the elastic washer 10 thereby causing the said washer to contract within the nut 7 and causing the threads 11 on the inner bore thereof to bind against the threads 6 of the bolt 5. It is therefore seen that either forward or rearward movement of the nut on the bolt is prevented.

It will be understood that the above description and accompanying drawings comprehend only the general and preferred form of my invention and that various minor changes in details of construction, proportion and arrangement of the parts may be made within the scope of the appended claims and without sacrificing any of the advantages of my invention.

Having thus fully described my invention what I claim as new and desire to secure by Letters Patent is:—

1. A nut lock in combination with a bolt having a threaded shank, a plurality of nuts threaded on said shank, and having their proximate faces cut out to provide registering bores of various configuration one of said bores being of conical form, a washer threaded on the bolt between said nuts, a portion of its periphery conforming to the configuration of the inner face of one of the nuts, and the remainder of the periphery conforming to the contour of the bore of the opposite nut, said washer adapted to be snugly engaged with the proximate faces of said nut to prevent accidental displacement of the nuts from the bolt.

2. A nut lock in combination with a bolt having a threaded shank, a pair of rigid nuts threaded on said shank and provided with registering cut-out portions, and an expansible washer mounted on said bolt between said nuts adapted to be completely housed in said cut-out portions and being contracted when said nuts are in a locked position.

3. A nut lock including a bolt, a plurality of nuts carried on said bolt, one of said nuts being provided with a frusto-conical bore on the one end thereof, an elastic washer carried on said bolt, the one end thereof having an outer periphery conforming to the curvatures of the frusto-conical inner end of said nut, the opposite end of said washer being provided with a polygonal external end, and a second nut threaded on said bolt and provided with an internal polygonal recess in one end adapted for locking engagement with the polygonal end of said washer.

In testimony whereof I affix my signature in presence of two witnesses.

WILLIAM E. RAEBURN.

Witnesses:
MYRTLE RAEBURN,
PEARL MACLACHLAN.